United States Patent
Minei et al.

(10) Patent No.: US 8,514,866 B1
(45) Date of Patent: *Aug. 20, 2013

(54) FILTERING TRAFFIC BASED ON ASSOCIATED FORWARDING EQUIVALENCE CLASSES

(75) Inventors: Ina Minei, Santa Clara, CA (US); James Washburn, Palo Alto, CA (US); Shivani Aggarwal, San Francisco, AZ (US)

(73) Assignee: Juniper Networks, Inc., Sunnyvale, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/027,122

(22) Filed: Feb. 14, 2011

Related U.S. Application Data

(63) Continuation of application No. 11/192,747, filed on Jul. 29, 2005, now Pat. No. 7,889,711.

(51) Int. Cl.
*H04L 12/28* (2006.01)

(52) U.S. Cl.
USPC ........ 370/400; 370/254; 370/351; 370/395.5; 370/419; 709/223; 709/238

(58) Field of Classification Search
USPC ...... 370/254, 351, 400, 419, 395.5; 709/238, 709/223
See application file for complete search history.

(56) References Cited

U.S. PATENT DOCUMENTS

| | | | |
|---|---|---|---|
| 6,618,760 B1 | 9/2003 | Aramaki et al. | |
| 6,857,026 B1 | 2/2005 | Cain | |
| 6,859,842 B1 | 2/2005 | Nakamichi et al. | |
| 7,082,102 B1 * | 7/2006 | Wright | 370/229 |
| 7,184,437 B1 | 2/2007 | Cole et al. | |
| 7,292,569 B1 * | 11/2007 | Smith et al. | 370/383 |
| 7,359,328 B1 | 4/2008 | Allan | |
| 7,463,591 B1 | 12/2008 | Kompella et al. | |
| 7,889,711 B1 | 2/2011 | Minei et al. | |
| 2002/0080794 A1 | 6/2002 | Reeves et al. | |
| 2004/0151180 A1 | 8/2004 | Hu et al. | |
| 2004/0156313 A1 | 8/2004 | Hofmeister et al. | |
| 2004/0213264 A1 | 10/2004 | Mistry et al. | |
| 2004/0223500 A1 | 11/2004 | Sanderson et al. | |
| 2005/0007954 A1 * | 1/2005 | Sreemanthula et al. | 370/229 |

(Continued)

OTHER PUBLICATIONS

U.S. Appl. No. 12/392,740, by Ghosh, filed Feb. 25, 2009.

(Continued)

*Primary Examiner* — Andrew Chriss
*Assistant Examiner* — Mohamed Kamara
(74) *Attorney, Agent, or Firm* — Shumaker & Sieffert, P.A.

(57) ABSTRACT

Filters are selectively applied to packets depending on forwarding equivalence classes (FECs) of the packets. A FEC filter is defined within the network device and qualified by incoming interface information that identifies source sites of the packets. A label distribution protocol (LDP) FEC is configured such that packets of the given FEC are associated with the FEC filter. The FEC identifies a destination site of the packets received by the router and is automatically combined with incoming interface information. In this way, packet flows may be filtered based on FECs of the packets. FEC filters may be further refined to operate at forwarding class granularity. The techniques allow accurate billing of packets traveling between specific source and destination sites regardless of the number of interfaces of the network device the packets utilize. In addition, the filtering can be used to provide anti-spoofing capabilities.

22 Claims, 5 Drawing Sheets

(56) References Cited

U.S. PATENT DOCUMENTS

| | | |
|---|---|---|
| 2005/0068933 A1* | 3/2005 | Kokkonen et al. ............ 370/349 |
| 2005/0083936 A1 | 4/2005 | Ma |
| 2005/0169264 A1 | 8/2005 | Kim et al. |
| 2006/0187935 A1 | 8/2006 | Smith et al. |
| 2006/0193248 A1 | 8/2006 | Filsfils et al. |
| 2006/0221867 A1 | 10/2006 | Wijnands et al. |
| 2006/0291445 A1 | 12/2006 | Martini et al. |
| 2007/0078970 A1 | 4/2007 | Zabihi et al. |
| 2007/0133529 A1 | 6/2007 | Lee et al. |

OTHER PUBLICATIONS

U.S. Appl. No. 10/045,717, by Kompella, filed Oct. 19, 2001.

* cited by examiner

FILTERING TRAFFIC BASED ON ASSOCIATED FORWARDING EQUIVALENCE CLASSES

This application is a continuation of application Ser. No. 11/192,747, filed Jul. 29, 2005 the entire content of which is hereby incorporated by reference.

TECHNICAL FIELD

The invention relates to computer networks and, more particularly, to techniques for filtering data within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. Upon receiving an incoming packet, the router examines information within the packet and forwards the packet in accordance with the routing information. When two routers initially connect, they typically exchange all of their routing information. The routers send control messages to incrementally update the routing information when the network topology changes. For example, the routers may send update messages to advertise newly available routes, and to withdraw routes that are no longer available.

From the routing information, the routers may generate forwarding information, which may be thought of as a subset of the information contained within the routing information. The routers use the forwarding information to relay packet flows through the network and, more particularly to relay the packet flows to appropriate next hops. In reference to forwarding a packet, the "next hop" from a network router typically refers to a neighboring device along a given route.

The routers may further apply packet filters to packet flows through the routers in order to take actions on a per-flow basis. For example, the router may compare header information within the packet to a set of filtering rules, sometimes referred to as "terms." The filtering rules may specify, for example, particular source IP addresses, destination IP addresses, source port, destination port, protocol and other criteria for filtering (i.e., selecting) packets for particular packet flows. Specifically, the routers identify packets from the packet flows that match the filtering rules, and perform actions on the packets depending on which filtering rule(s) the packets matched. The actions may include dropping the packets, remarking the packets as lower or higher priority, counting packets that match the filtering rules, updating customer billing information, or performing any other suitable action.

Conventional routers typically apply the filters to packet flows on either incoming interfaces or outgoing interfaces, which may be physical or logical interfaces. For instance, a router may apply an interface-specific filter to each of the packet flows received or forwarded by a given interface. However, in some cases, per interface granularity may be too coarse for certain actions, such as applying filters to allow accurate billing and policing of the packet flows on an interface-by-interface basis. For example, traffic coming in on an input interface of a router from a virtual private network (VPN) customer site may be destined to any other site in the VPN. Similarly, traffic going out of an output interface of a router toward a network core may be coming in from any of the VPN customer sites connected to the router. As a result, the number of packets flows identified by a filter for a particular interface may be too voluminous and may erroneously include many unrelated packet flows.

SUMMARY

In general, the principles of the invention relate to techniques for selectively applying filters to packets depending on forwarding equivalence classes (FECs) of the packets. A FEC comprises a set of packets that are forwarded through a network in the same manner, i.e., over the same path. For example, the label distribution protocol (LDP) associates a FEC with each label switched path (LSP) set up across a network. In this way, the packet flows may be filtered based on FECs of the packets. FEC filters may be further refined to operate at forwarding class granularity. The techniques allow actions to be accurately taken (e.g., dropping, changing priority and billing) for packets traveling between specific source and destination sites. In addition, the techniques can provide anti-spoofing capabilities.

As further described, a FEC filter is configured to define actions to be performed on packets by a router. The FEC filter is qualified by incoming interface information that identifies source sites of the packets. An LDP FEC is configured and utilized within the network such that packets of the given FEC are associated with the FEC filter by a router or another device. The FEC may identify a destination site of the packets received by the router and is automatically combined with the incoming interface information. Routing information stored in the router is updated to correlate an index of the FEC filter with an address of a next hop for the FEC.

The router, for example, may receive packets from multiple customer site networks and apply a FEC filter to the packets traveling through a network in accordance with a given FEC. When a packet of the given FEC is received from a source site identified in the FEC filter, the router performs an associated action on the matching packet. Example actions include dropping the packet, counting the packet in order to maintain traffic statistics, marking the packet with a loss priority, updating billing and account information and changing the forwarding class of the packet. The router may then forward the packet to an appropriate next hop. When a packet does not match the FEC or the source site, the router forwards the packet directly to the next hop without applying the action(s) associated with the FEC filter.

In one embodiment of the principles of the inventions, a method comprises receiving a data packet, identifying a LDP FEC of the data packet, and selectively applying a FEC filter to the data packet based on the identified LDP FEC.

In another embodiment, a network device comprises an incoming interface that receives a data packet, routing information that identifies a LDP FEC of the data packet, and a FEC filter selectively applied to the data packet based on the identified LDP FEC.

In another embodiment, a computer-readable medium comprises instructions that cause a programmable processor to receive a data packet, identify a LDP FEC of the data packet, and selectively apply a FEC filter to the data packet based on the identified LDP FEC.

The details of one or more embodiments of the principles of the invention are set forth in the accompanying drawings and the description below. Other features, objects, and advantages of the invention will be apparent from the description and drawings, and from the claims.

DETAILED DESCRIPTION

Figure 1:
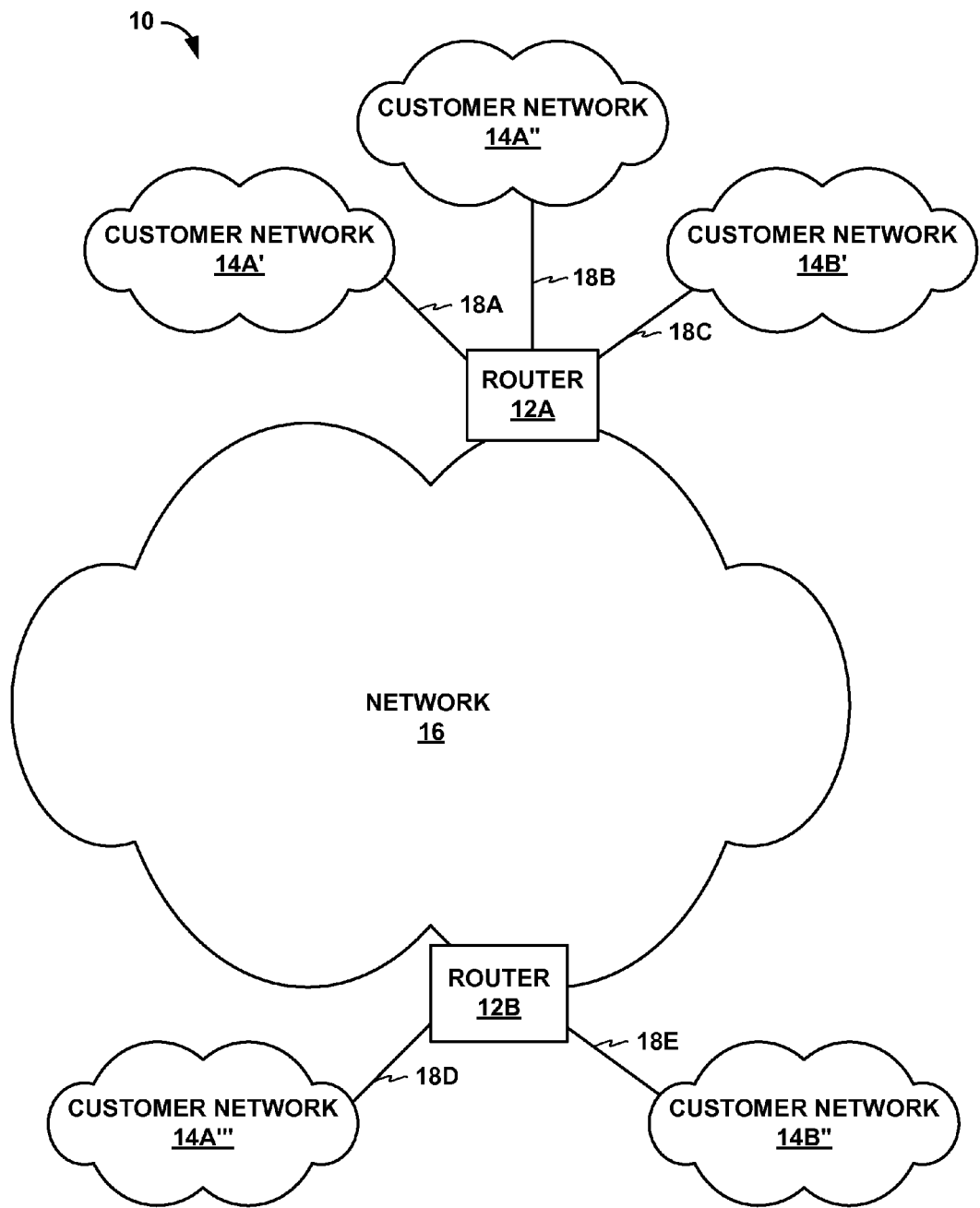
FIG. 1 is a block diagram illustrating an example system comprising routers that filter packet flows based on forwarding equivalence classes of the packets in accordance with the principles of the invention.

FIG. 1 is a block diagram illustrating an example system 10 comprising routers 12A-12B ("routers 12") that filter packet flows based on forwarding equivalence classes (FECs) of the packets in accordance with the principles of the invention. In this way, the packet flows may be filtered with per forwarding class granularity. In general, the term "filtering" is used herein to refer to any action taken in response to identification of a packet matching a defined rule. For example, the filtering may be used for a variety of purposes, such as to allow accurate billing and policing of packets traveling between specific source and destination sites based on the FECs of the packets. Example actions that may be applied include dropping the packet, counting the packet in order to maintain traffic statistics, marking the packet with a loss priority, updating billing and account information and changing the forwarding class of the packet. In addition, as discussed further below, the techniques may be used to provide anti-spoofing capabilities.

In the example of FIG. 1, routers 12 couple customer networks 14A-14B ("customer networks 14") for customer A and customer B to a network 16. Network 16 may comprise any network, such as the Internet, that includes a number of devices, such as routers and switches, used to forward packets across network 16. Traffic travels between customer networks 14 across a multi-protocol label switching (MPLS) path. In cases where customer networks 14 are geographically remote from each other, traffic may travel across a virtual private local area network (LAN) service (VPLS) path, which may incorporate Ethernet and MPLS capabilities.

Customer networks 14 may be geographically distributed sites of multiple customers. In the example of FIG. 1, customer networks 14 include customer networks for two customers: customer A and customer B. For example, customer A includes customer networks 14A', 14A'', and 14A'''. Each of customer networks 14 includes one or more devices (not shown), such as personal computers, laptop computers, handheld computers, workstations, servers, routers, switches, printers, fax machines, or the like. Customer networks 14 may include one or more LANs, wide area networks (WANs), or the like. Although system 10 may include any number of customer networks coupled to network 16 by any number of routers, FIG. 1, for simplicity, shows only five customer networks 14 coupled to network 16 by two routers 12. Each of customer networks 14 connects to routers 12 via one or more access links 18A-E ("access links 18").

Customer networks 14 may communicate with remote network devices within network 16. Further, customer networks 14 may securely transmit packet flows between associated customer networks 14 via corresponding virtual private networks (VPNs) (not shown). For example, customer A may securely transmit packet flows between customer network 14A', customer network 14A'', and customer network 14A''' via an associated VPN and routers 12. In addition, associated customer networks 14 may be connected to each other by label switched paths (LSPs) set up across network 16 by the LDP.

In general, routers 12 filter (i.e., apply actions to) packet flows transmitted between specific source and destination customer networks 14 in accordance with the principles of the invention. More specifically, routers 12 filter the packet flows based on FECs of the packets. A FEC comprises a set of packets that are forwarded through network 16 in the same manner, e.g., over the same path. For example, the LDP may associate a FEC with each LSP created across network 16.

FEC filters, as described herein, may be configured to define actions to be performed by routers 12 on incoming packets based on the FEC associated with the LDP carrying the packets. FEC filters are qualified by incoming interface information that identifies source customer networks 14 of the packets. An LDP FEC within network 16 is configured such that packets of the given FEC are associated with the FEC filter upon arriving at routers 12. The configured LDP FEC may uniquely identify destination customer networks 14 of the packets received by routers 12, and the routers may automatically combine the FEC with the incoming interface information. Routing information stored in routers 12 is updated to correlate an index of the FEC filter with a next hop for the FEC.

Routers 12 receive packets from customer networks 14 and apply one or more FEC filters to the packets traveling through network 16 in accordance with the FEC associated with the LDP carrying the packets. When a packet of the given FEC is received from a source customer network identified in the FEC filter, the receiving one of routers 12 performs the associated action on the matching packet. The action may include dropping the packet, counting the packet in order to maintain traffic statistics, marking the packet with a loss priority, updating billing or other customer information, and changing the forwarding class of the packet. After performing the action, the router may forward the packet to an appropriate next hop. When a packet does not match the FEC or the source site, the receiving one of routers 12 forwards the packet directly to the next hop without applying the action(s) associated with the FEC filter.

In some cases, a FEC filter may include one or more policers configured to perform actions based on a preset bandwidth limit and/or burst-size limit of the associated FEC. The policers may discard or mark packets that exceed the preset limits. In this way, the FEC filter can accurately regulate an amount of traffic flowing over an LSP associated with the FEC to improve traffic flow over the LSP. In addition, the FEC filter can determine a forwarding class of the traffic such that packets belonging to a certain forwarding class may have a higher or lower priority than packets of another forwarding class.

For example, router 12A may apply a FEC filter to update accounting and usage information for traffic traveling between two customer networks, such as customer network 14A' and customer network 14A'''. Router 12A may apply a FEC filter that has filtering rules and associated actions that count packets of a FEC with destination customer network 14A''' received from source customer network 14A'. In this way, an accurate packet count can be performed between source customer network 14A' and destination customer network 14A', which enables accurate billing and reporting.

As another example, router 12A may apply a FEC filter to eliminate spoofing from unauthorized customer networks. For example, assume that customer network 14B' is not allowed to forward packets to customer network 14A'''. Router 12A may apply a FEC filter that has filtering rules and associated actions that discard packets of the FEC traveling from source customer network 14B', but allow packets from customer network 14A' or customer network 14A'', which are both authorized to talk with customer network 14A'''. By applying a FEC filter, even if the label of an authorized customer network is correctly guessed such that the packet appears to belong to the FEC, the FEC filter identifies the actual source customer network as 14B' and therefore discards the unauthorized packet.

Further, router 12A may support multi-level filtering in that, in addition to application of the FEC filters, router 12A may apply input and output interface filters to the packets. For example, router 12A may apply a first input interface filter to a packet flow received from a first interface, and a second input interface filter to a packet flow received from a second interface. Router 12A may then apply a common FEC filter to the packet flows of the FEC, and may also apply one or more output interface filters to the packet flows before forwarding the packets via output interfaces. Moreover, router 12A may accurately filter packets when customer networks 14 communicate packets over a VPN even though the packets may be received at a common physical or logical interface.

Figure 2:
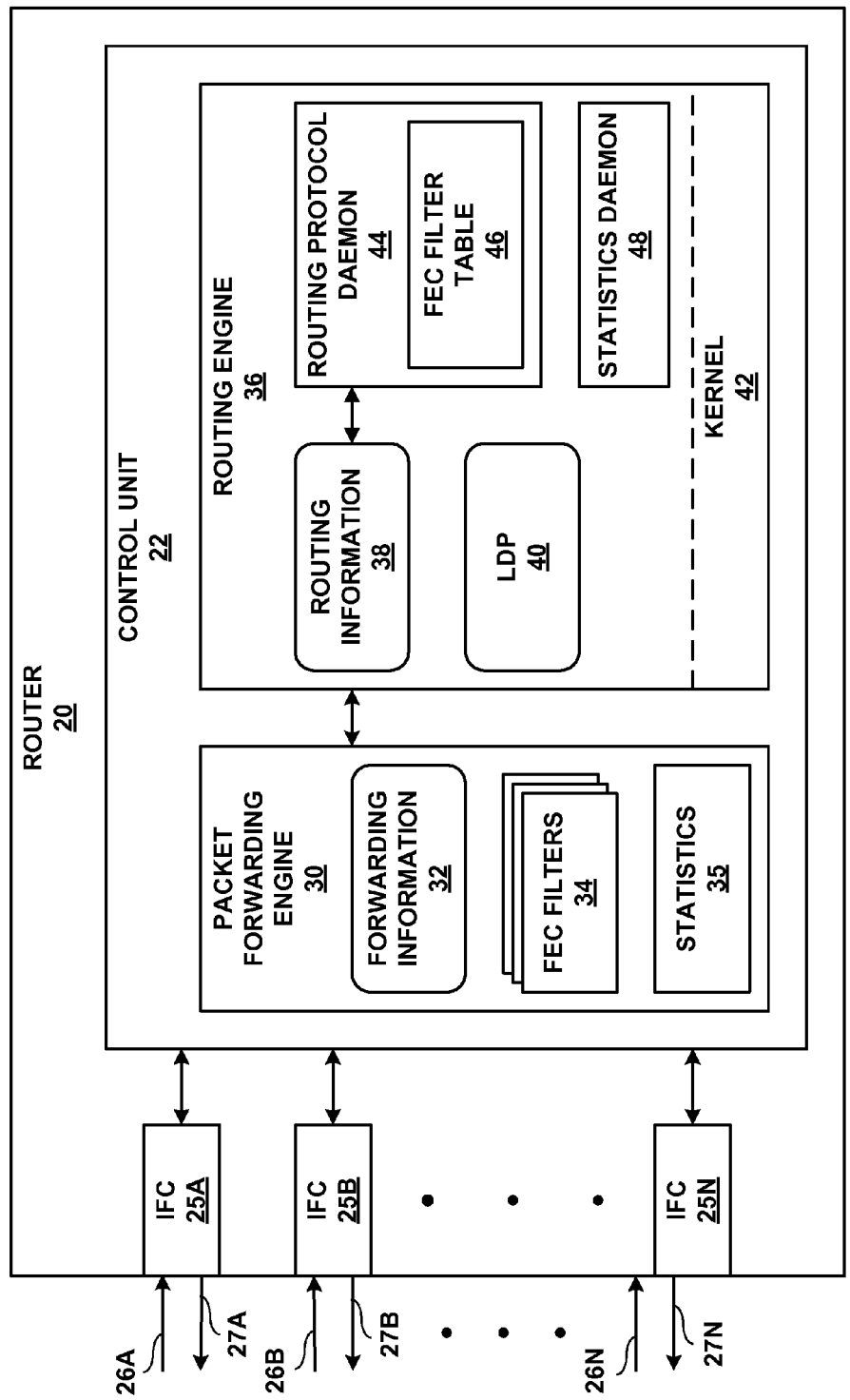
FIG. 2 is a block diagram illustrating an exemplary router that filters packets in accordance with the principles of the invention.

FIG. 2 is a block diagram illustrating an exemplary router 20 that filters packets in accordance with the principles of the invention. Router 20 may operate substantially similar to routers 12 from FIG. 1. In particular, router 20 selectively filters packet flows based on a respective FEC associated with a specific path, e.g., an LSP, across a network, such as network 16.

Router 20 includes interface cards 25A-25N ("IFCs 25") that receive packets via inbound links 26A-26N ("inbound links 26") and send packets via outbound links 27A-27N ("outbound links 27"). IFCs 25 are typically coupled to links 26, 27 via a number of interface ports. Router 20 also includes a control unit 22 that determines routes of received packets and forwards the packets accordingly via IFCs 25.

Control unit 22 includes a packet forwarding engine (PFE) 30 and a routing engine 36, in which a routing protocol daemon (RPD) 44 and a statistics daemon 48 execute. Routing engine 36 is primarily responsible for maintaining routing information 38 to reflect the current network topology. In accordance with routing information 38, packet forwarding engine 30 maintains forwarding information 32 that associates destination information, such as IP address prefixes, with next hops and corresponding interface ports of IFCs 25. Forwarding information 32 may, therefore, be thought of as a subset of the information contained within routing information 38.

Upon receiving an inbound packet, packet forwarding engine 30 directs the inbound packet to an appropriate IFC 25 for transmission based on forwarding information 32. In one embodiment, each of packet forwarding engine 30 and routing engine 36 may comprise one or more dedicated processors, hardware, and the like, and may be communicatively coupled by a data communication channel, e.g., a high-speed network connection, bus, shared-memory or other data communication mechanism.

In the illustrated embodiment, LDP 40 executes within routing engine 36. In particular, LDP 40 establishes LSPs across the network on which packets are transmitted. LDP 40 assigns a FEC to each of the LSPs such that packets traveling over the same LSP belong to the same FEC. The FEC may identify a destination site for the associated LSP. A label of a particular packet identifies the LSP and the associated FEC for that LSP.

In addition to forwarding information 32, packet forwarding engine 30 includes FEC filters 34 and statistics 35 received from FEC filters 34. Each of FEC filters 34 may be associated with a specific FEC assigned by LDP 40 to a specific path through the network. FEC filters 34 may be defined based in part on incoming interface information that identifies a source site of the incoming packets. An administrator or software agent interacts with routing engine 36 to configure FEC filters 34 to define actions to be performed by router 20 on packets of the FEC that match one of the incoming interfaces identified in the FEC filter. Once configured, routing engine 36 constructs each of FEC filters 34 in packet forwarding engine 30.

The actions performed by FEC filters 34 may include dropping the packet, counting the packet in order to maintain statistics 35, marking the packet with a loss or gain in priority, updating a customer account or billing information, and changing the forwarding class of the packet. When a packet of the FEC does not match with one of the incoming interfaces identified in the FEC filter, router 20 forwards the packet across the network without applying one of FEC filters 34.

Provided below is an example configuration for FEC filters 34.

```
firewall {
    policer <policer-name> {
        if-exceeding {
            bandwidth-limit < >;
            burst-size-limit < >;
        }
        then {
            loss-priority < >;
            forwarding-class < >;
        }
    }
    interface_set <set-name> {
        <interface-1>;
        <interface-2>;
        ...
    }
    family any {
        filter <filter-name> {
            term <term-name> {
                from {
                    interface < >/interface set < >;
                    forwarding-class < >;
                }
                then {
                    policer <policer-name>;
                    count <counter-name>;
                }
            }
        }
    }
}
```

-continued

```
    }
}
```

The identifiers 'interface' and 'interface_set' are mutually exclusive options. Interface allows configuration of a single interface as a match condition whereas interface_set allows configuration of multiple interfaces as a match condition. This may be useful when a network administrator desires aggregate traffic statistics from several interfaces under a single filter. As can be seen, a FEC filter may include policer capabilities that enable a router to perform actions when a packet flow exceeds a bandwidth limit or a burst-size limit.

In addition, a policer may set a forwarding class of a packet flow based on the bandwidth and/or the burst-size of the packet flow. The filter may be further qualified with forwarding class information that identifies a forwarding class of the incoming packets. In this way, even if packets belong to the same FEC and are received from the same source site, the packets may be counted separately based on different forwarding classes of the packets.

In accordance with the principles of the invention, LDP 40 within routing engine 36 is configured such that packets of a given FEC may be associated with a corresponding one of FEC filters 34 implemented by router 20. In this way, the FEC is automatically combined with incoming interface information because the FEC filter is qualified with incoming interface information that identifies the source site. An exemplary configuration of LDP 40 is given below. As can be seen, the corresponding FEC filter 34 may filter either ingress traffic originating at router 20 or transit traffic through router 20 for a particular LSP.

```
protocols {
    ldp {
        policing {
            fec < > {
                ingress-traffic <filter-name>;
                transit-traffic <filter-name>;
            }
        }
    }
}
```

Routing engine 36 constructs FEC filters 34 in packet forwarding engine 30 from the configuration given above. FEC filters 34 may be defined under 'firewall any' and are referenced as 'protocols ldp policing fec <fec-name> ingress-traffic <filter-name>,' in the case of an ingress traffic filter. Each of FEC filters 34 may be instantiated with the naming convention given in Table 1 according to where the protocols { ... } stanza occurs in terms of the logical router and routing instance hierarchy levels. The naming convention automatically associates the FEC filter with the FEC. FEC filters 34 may be downloaded to packet forwarding engine 30 from routing engine 36.

TABLE 1

| Logical router | Routing instance | Name |
| --- | --- | --- |
| 0 | 0 | <filter-name>-<fec-name> |
| 0 | 1 | <filter-name>-<ri_name>-<fec-name> |
| 1 | 0 | <filter-name>-<lr_name>-<fec-name> |
| 1 | 1 | <filter-name>-<lr_name>-<ri_name>-<fec-name> |

In one embodiment, routing protocol daemon 44 maintains a FEC filter table 46 that maps filter names to indices. The naming convention for FEC filters 34, given in Table 1, automatically creates a correlation between the FEC and the associated one of FEC filters 34, which can be useful for SNMP (Single Network Management Protocol) and display purposes. Routing protocol daemon 44 updates routing information 38 to reflect the current topology of the network. In addition, routing protocol daemon 44 inserts FEC filter table 46 into routing information 38 in order to correlate the FEC filter indices stored in FEC filter table 46 with the next hops of the associated FECs. Each packet of a particular FEC, which has the same route and therefore the same next hop, are then forwarded to a corresponding one of FEC filters 34 in PFE 30 before being forwarded to the next hop.

When an LDP LSP is downloaded to the routing engine kernel 42, the FEC filter index for a specific FEC is added in a 'route add' message. If the one of FEC filters 34 associated with the FEC changes or the FEC filter is removed from the FEC, this change is also propagated to kernel 42. Routing engine 36 then forwards a 'next hop' message to packet forwarding engine 30 to update forwarding information 32 and install the LDP and any corresponding FEC filter.

Once the FEC filters indices are added to routing information 38, they are integrated into the forwarding path defined by forwarding information 32 of packet forwarding engine 30. When an incoming packet is received by one of IFCs 25, packet forwarding engine 30 examines forwarding information 32 to select a next hop for the packet. Packet forwarding engine 30 determines a label associated with the selected next hop. If the packet belongs to a FEC associated with one of FEC filters 34, packet forwarding engine 30 also determines an index of the corresponding one of FEC filters 34.

When a FEC filter is to be installed for an LSP, routing engine 36 sets the FEC filter index field (nhdb_msg_nh_cmd_t.nh_filter_index) to a non-zero value within the next hop message output to packet forwarding engine 30. This value is the FEC filter index of the one of FEC filters 34 to be linked into the forwarding path. Packet forwarding engine 30 detects the non-zero value when adding the next hop to the forwarding path, and inserts the corresponding one of FEC filters 34 into the topology along with the next hop. In this way, packet forwarding engine 30 applies one of FEC filters 34 to each incoming packet that belongs to a corresponding FEC before forwarding the packet to the next hop of the FEC via one of IFCs 25. Moreover, packet forwarding engine 30 applies the FEC filters 34 to the packets that match with one of the source sites identified in the configuration of the FEC filters.

Statistics 35 are collected from FEC filters 34 and may be stored in the dynamic remote access memory (DRAM) of packet forwarding engine 30. Statistics 35 may include marked packet counts and dropped packet counts from policers within FEC filters 34. In addition, statistics 35 may include byte and packet counts from any addition counters configured in FEC filters 34. The byte and packet counts enable accurate billing of customer services because they represent traffic counts between specific source and destination sites. Statistics 35 remain persistent over LSP flaps, as long as the configuration of associated FEC filters 34 does not change.

An administrator or remote software agent may access statistics 35, e.g., via a CLI (command line interface) using a 'show firewall' command or via the firewall MIB (management information base). Statistics 34 may also be accessed via SNMP with no changes to the firewall MIB. FEC filters 34 appear in the MIB sorted by the filter name. As described above, the filter name identifies the associated FEC.

In addition, statistics 35 may be accessed by statistics daemon 48 using existing routing socket APIs such as, for example, rtslib_dfwsm_list_get_counters( ). Statistics daemon 48 can easily find the counters associated with a given FEC, because the FEC name is part of the FEC filter name, and the routing socket allows statistics daemon 48 to query all the counters and policers contained in a given one of FEC filters 34.

In one embodiment, for every one of FEC filters 34 downloaded to packet forwarding engine 30, there may be a struct dfw_entry_t, which remains until the filter is removed from the forwarding path. When a FEC filter is removed from the forwarding path, the function dfw_counter_update_and_clear( ) may be called, which sums up the hardware counter values and stores them in arrays (e.g., dfw_policer_pkt, dfw_counter_pkt, dfw_counter_byte) within dfw_entry_t. These values can be reused when and if the FEC filter is again inserted into the forwarding path. In one embodiment, packet forwarding engine 30 allocates 8 bytes of DRAM storage per packet or byte count. Thus, as long as the filter is not deleted from packet forwarding engine 30, which would require a configuration change, the statistics remain persistent over LSP flaps.

In some cases, an LDP LSP may be established over an LSP of another protocol, such as the resource reservation protocol (RSVP). When filtering is performed based on the LDP FEC and the RSVP LSP is being policed as well, two filter indices may be associated with a single next hop. One solution is to enable the FEC filter index associated with the inner label (i.e. the LDP LSP next hop) to override the FEC filter index associated with the RSVP LSP next hop. If this is an indirect next hop, all the gateways of this indirect next hop inherit the FEC filter index configured for the LDP FEC.

Another solution is to allow the traffic to pass through both FEC filters. The FEC filters can be chained in packet forwarding engine 30. For example, two LDP FECs may travel over an RSVP LSP next hop with a filter f3. In packet forwarding engine 30 there may be a unique next hop for each FEC. If FEC1 has filter f1 and FEC2 has filter f2, the FEC filters can be chained onto the next hop as shown.

FEC1: next hop A→f1→f3
FEC2: next hop B→f2→f3

In this case, instead of a single filter in the next hop message, routing information 38 provides an array of filters, one for each label. One side effect of chaining the filters is that if traffic is counted for FEC1 via filter f1, but the RSVP filter f3 causes the packet to be dropped, filter f1 will still count this packet since it will pass through filter f1 first.

The architecture of router 20 illustrated in FIG. 2 is for exemplary purposes only. The invention is not limited to this architecture. In other embodiments, router 20 may be configured in a variety of ways. In some embodiments, packet forwarding engine 30 and/or routing engine 36 and the corresponding functionality may be replicated and incorporated directly within IFCs 25.

Figure 3:
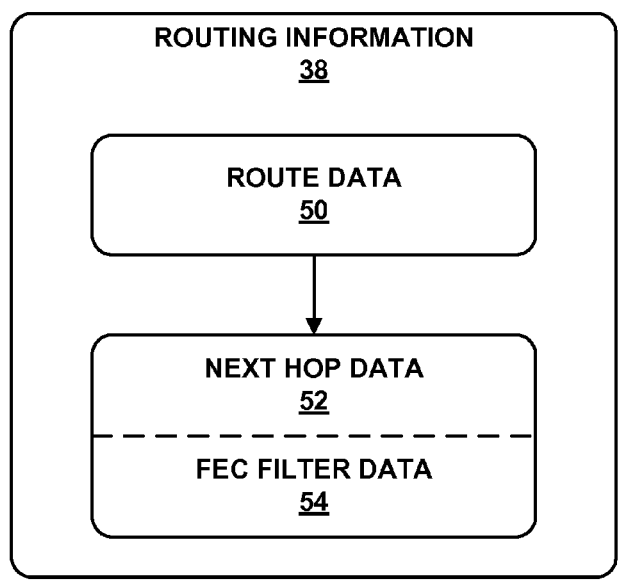
FIG. 3 is a block diagram illustrating exemplary routing information of the exemplary router in greater detail.

FIG. 3 is a block diagram illustrating an example embodiment of routing information 38 of exemplary router 20 in greater detail. Routing information 38 may include, for example, route data 50 that describes various routes within the network, and corresponding next hop data 52 indicating appropriate neighboring devices within the network for each of the routes. In accordance with the invention, routing information 38 also includes FEC filter data 54 that indicates an appropriate one of FEC filters 34 associated with specific next hops of next hop data 52. Routing protocol daemon 44 updates routing information 38 to reflect the current topology of the network, including FEC filter indices from FEC filter table 46.

Routing information 38 may associate each next hop with one of outbound links 27 of IFCs 25. Routing engine 36 installs next hop data 52 and FEC filter data 54 within packet forwarding engine 30. For example, as described above, routing engine 36 may output a next hop message to packet forwarding engine 30 that specifies one or more next hop labels and any associated FEC filter indexes.

Upon receiving an inbound packet, packet forwarding engine 30 examines next hop data 52 to identify a next hop for the packet. In the event a FEC filter index from FEC filter data 54 is associated with the selected next hop, packet forwarding engine 30 applies the one or more of FEC filters 34 that corresponds to the FEC filter index. If the packet is not discarded by the corresponding FEC filter 34, PFE 30 examines the next hop label and determines an interface port associated with the next hop. PFE 30 then forwards the packet to the appropriate one of IFCs 25 for transmission.

Since packets of a particular FEC are forwarded across the network along the same LSP in a similar fashion, each packet with the same next hop will be forwarded to the corresponding one of FEC filters 34 in packet forwarding engine 30.

In some cases, next hop data 52 may make use of indirect references to associate routes with corresponding next hops. In other words, next hop data 52 may use intermediate data structures, i.e., indirect next hop data, that map destinations to next hops and, in this case, associated FEC filters. In particular, the indirect next hop data is structured such that destinations that make use of the same next hop from router 20 reference common portions of next hop data 52 and FEC filter data 54. In this manner, router 20 need not maintain separate next hop data for each individual destination. In addition, routing information 38 may maintain references that bypass the indirect next hop data, and associate route data 50 directly with next hop data 52 and associated FEC filter data 54. Indirect next hops are described in further detail in copending and commonly assigned U.S. patent application Ser. No. 10/045,717, entitled "NETWORK ROUTING USING INDIRECT NEXT HOP DATA," to Kireeti Kompella, filed Oct. 19, 2001 and U.S. patent application Ser. No. 10/197,922, entitled "SCALABLE ROUTE RESOLUTION," to Bruce A. Cole and James Murphy, filed Jul. 17, 2002, hereby incorporated by reference.

In response to a change in network topology, router 20 can dynamically reroute packets for multiple destinations by changing a common portion of next hop data 52. More specifically, because routes using the same next hops share a common portion of next hop data 52 and FEC filter data 54, packet forwarding engine 30 can update both the installed portion of next hop data 52 and FEC filter data 54 without needing to update route data 50, which can be significantly large for some networks. In this fashion, packet forwarding engine 30 can update large numbers of routes, and thereby quickly reroute packets, with minimal changes to the routing information 38.

Figure 4:
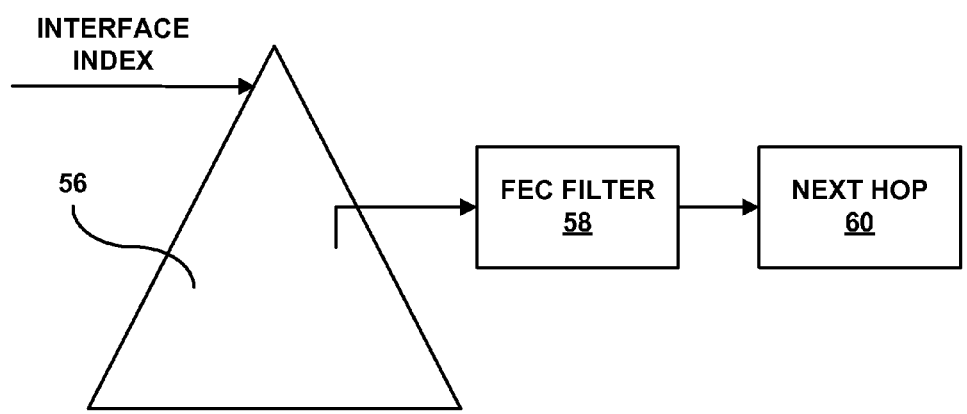
FIG. 4 is a block diagram illustrating exemplary data structures in which routing information of the exemplary router is arranged as a radix tree.

FIG. 4 is a block diagram illustrating exemplary data structures in which forwarding information 32 of exemplary router 20 is arranged as a radix tree 56. Radix tree 56 maps network destinations to next hops and any associated FEC filters, e.g., a next hop 60 and an associated FEC filter 58. In this example, radix tree 56 includes a number of leaf nodes (not shown) that each correspond to a network destination. For large networks, radix tree 56 can become sizable and may easily include over 300,000 leaf nodes. In addition, a number of indirect next hops may be linked in dependent form off of the leaf nodes.

The arrangement of forwarding information 32 as radix tree 56 is illustrated for exemplary purposes. In other embodiments, forwarding information 32 may be arranged, for example, as a number of tables, link lists, and other data structures.

Figure 5:
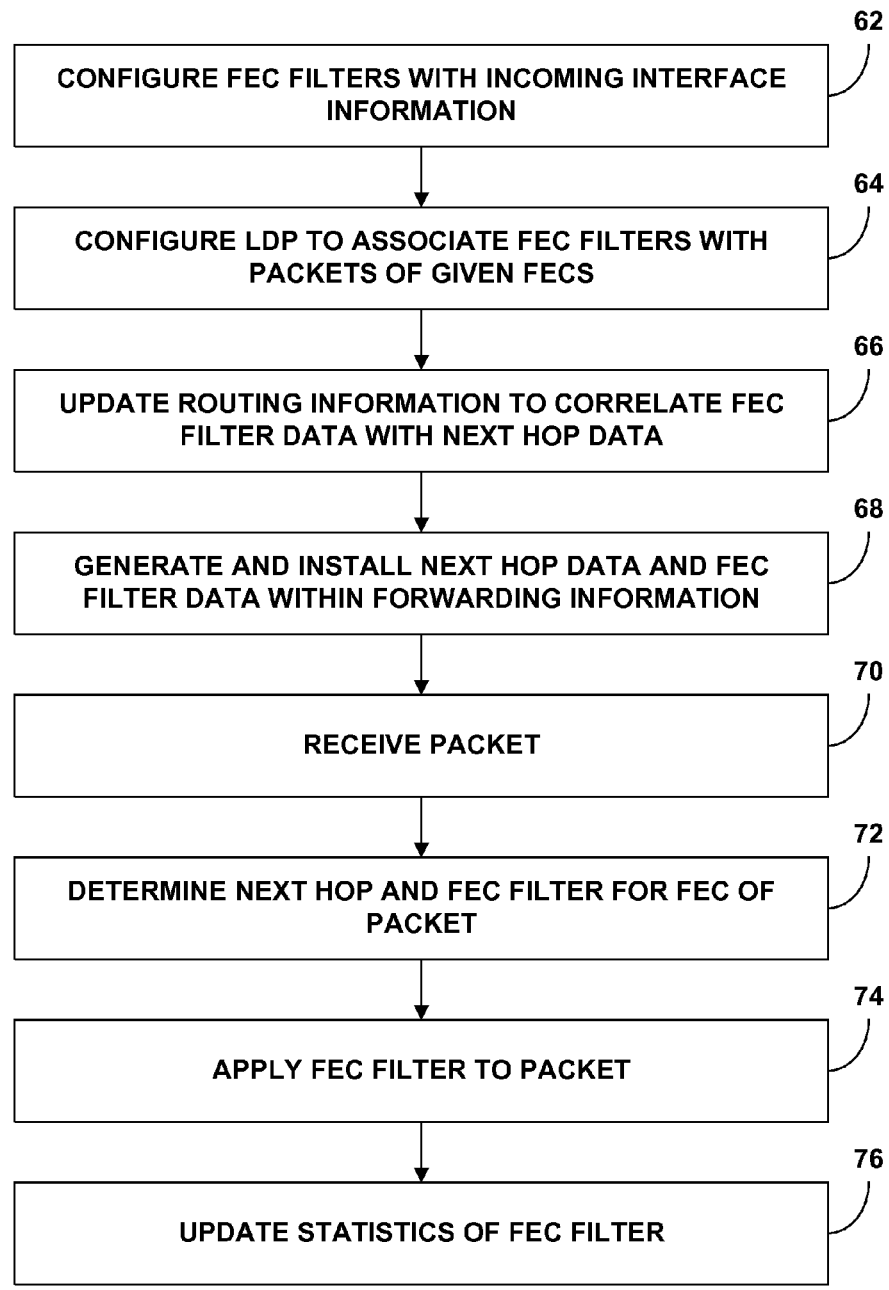
FIG. 5 is a flowchart illustrating an example process of filtering packets in accordance with the principles of the invention.

FIG. 5 is a flowchart illustrating an example process of filtering packets in accordance with the principles of the invention. For exemplary purposes, the process is described herein in reference to router 20 of FIG. 2. The illustrated process may be desirable to system administrators that wish to accurately bill each of the network customers based on traffic counts between specific source sites and specific destination sites, regardless of whether the traffic traverses one or more interfaces of router 20. Furthermore, the process allows a system administrator to substantially eliminate spoofing by unauthorized customers.

Initially, the administrator or software agent configures FEC filters 34 to perform actions on incoming packets qualified by incoming interface information (62). Next, routing engine 36 constructs FEC filters 34 in packet forwarding engine 30 based on the configuration data provided by the administrator. The administrator or software agent also configures LDP 40 to associate FEC filters 34 with packets that belong to given FECs (64). As a result, FEC filters 34 are included in FEC filter table 46 maintained by routing protocol daemon 44. Routing protocol daemon 44 updates routing information 38 to maintain the current network topology and to correlate FEC filter 34 with the next hop of an associated FEC (66). Routing engine 34 generates and installs next hop data 52 and FEC filter data 54 within forwarding information 32 of packet forwarding engine 30 (68). For example, routing engine 36 sends one or more next hop messages to packet forwarding engine 30 that specify the LSP label of the next hop and the index of the associated one of FEC filters 34. Packet forwarding engine 30 updates forwarding information 32 to insert the one of FEC filters 34 that corresponds to the received FEC filter index into the forwarding path along with the next hop.

Upon receiving a packet (70), packet forwarding engine 30 accesses forwarding information 32 and determines the next hop of the packet and any of FEC filters 34 associated with the FEC of the packet (72). Packet forwarding engine 30 applies the associated FEC filters 34 (74) and updates statistics 36 (76). For example, packet forwarding engine may record marked and dropped packet counts and packet and byte counts. Subsequently, the administrator or the software agent accesses statistics 36 for any of a variety of purposes, e.g., to accurately generate customer invoices.

Figure 6:
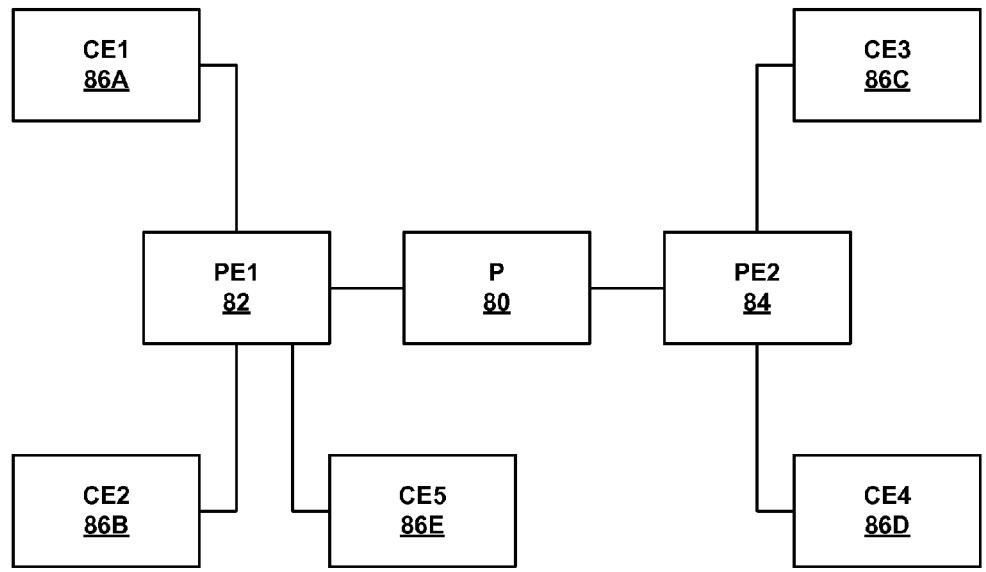
FIG. 6 is a block diagram illustrating an exemplary network system in which routers perform traffic filtering in accordance with the invention.

FIG. 6 is a block diagram illustrating an exemplary network system in which routers perform traffic filtering in accordance with the invention. The illustrated network system may comprise a carriers' carrier (CoC) VPN system. A VPN provider may include core router (P) 80, provider edge router (PE1) 82 and provider edge router (PE2) 84. In one embodiment, customer edge routers (CE1-CE5) 86A-86E form a VPN and are connected to each other via LDP LSPs.

Example 1

In this example, provider edge router (PE1) 82 performs accounting for all traffic destined to FEC CE3 and to FEC CE4. Further, traffic of different forwarding classes are counted separately for traffic from customer edge router (CE1) 86A to customer edge router (CE3) 86C in accordance with the following configuration data:

```
firewall {
    family any {
        filter f1 {
            term 1 {
                from {
                    forwarding-class assured-forwarding;
                    interface PE1-CE1;
                }
                then {
                    count c1;
                }
            }
            term 2 {
                from {
                    forwarding-class best-effort;
                    interface PE1-CE1;
                }
                then {
                    count c2;
                }
            }
            term 3 {
                then {
                    count c3;
                }
            }
        }
        filter f2 {
            term 1 {
                then {
                    count c;
                }
            }
        }
    }
}
protocols {
    ldp {
        policing {
            fec <CE3> {
                transit-traffic f1;
            }
            fec <CE4> {
                transit-traffic f2;
            }
        }
    }
}
```

Example 2

In this example, provider edge router (PE1) 82 counts traffic from customer edge router (CE1) 86A to customer edge router (CE3) 86C and from customer edge router (CE2) 86B to customer edge router (CE3) 86C together. Traffic from customer edge router (CE5) 86E to customer edge router (CE3) 86C is counted separately in accordance with the following configuration data:

```
firewall {
    interface_set intf_set {
        PE1-CE1;
        PE1-CE2;
    }
    family any {
        filter f {
            term 1 {
                from {
                    interface_set intf_set;
                }
                then {
                    count c1;
                }
```

```
            }
        term 2 {
            from {
                interface PE1-CE5;
            }
            then {
                count c2;
            }
        }
    }
}
protocols {
    ldp {
        policing {
            fec <CE3> {
                transit-traffic f;
            }
        }
    }
}
```

Example 3

In this example, FEC filters are used to provide anti-spoofing capabilities. Provider edge router (PE1) 82 discards all traffic destined to FEC CE3 from customer edge router (CE2) 86B, but allows traffic from all other sources as follows:

```
firewall {
    family any {
        filter f {
            term 1 {
                from {
                    interface PE1-CE2;
                }
                then {
                    discard;
                }
            }
            term 2 {
                then {
                    count c;
                }
            }
        }
    }
}
protocols {
    ldp {
        policing {
            fec <CE3> {
                transit-traffic f;
            }
        }
    }
}
```

Example 4

In this example, provider edge router (PE1) 82 counts traffic going from customer edge router (CE1) 86A to customer edge router (CE3) 86C and from customer edge router (CE2) 86B to customer edge router (CE3) 86C separately. In addition, PE1 drops traffic traveling from CE1 to CE3 if it exceeds a certain bandwidth, and marks traffic to a high loss priority if the traffic exceeds a certain bandwidth from CE2 to CE3 as follows:

```
firewall {
    policer p1 {
        if-exceeding {
            bandwidth-limit 5m;
            burst-size-limit 150k;
        }
        then {
            discard;
        }
    }
    policer p2 {
        if-exceeding {
            bandwidth-limit 5m;
            burst-size-limit 150k;
        }
        then {
            loss-priority high;
        }
    }
    family any {
        filter f {
            term 1 {
                from {
                    interface PE1-CE1;
                }
                then {
                    policer p1;
                }
            }
            term 2 {
                from {
                    interface PE1-CE2;
                }
                then {
                    policer p2;
                }
            }
        }
    }
}
protocols {
    ldp {
        policing {
            fec <CE3> {
                transit-traffic f;
            }
        }
    }
}
```

Figure 7:
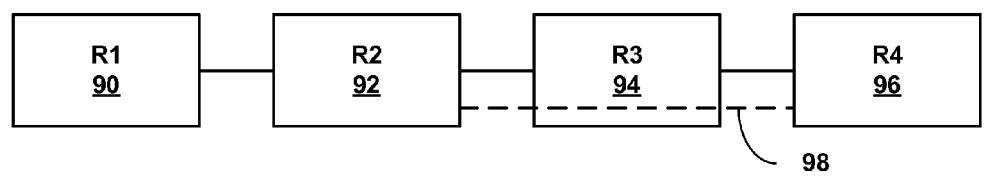
FIG. 7 is a block diagram illustrating another exemplary network system in which routers perform traffic filtering in accordance with the invention.

FIG. 7 is a block diagram illustrating another exemplary network system in which routers perform traffic filtering in accordance with the invention. The illustrated network system comprises a router (R1) 90, an ingress router (R2) 92 for a network (not shown), a transition router (R3) 94, and an egress router (R4) 96 for the network. A LDP LSP 98 is set up between ingress router 92 and egress router 96. Traffic from ingress router 92 to egress router resolves over LSP 98.

Example 5

In this example, ingress router (R2) 92 polices the ingress traffic such that traffic from router (R1) 90 resolving over LDP LSP 98 is dropped if it exceeds a certain threshold:

```
firewall {
    policer p {
        if-exceeding {
            bandwidth-limit 5m;
            burst-size-limit 150k;
        }
        then {
            discard;
```

```
            }
        }
        family any {
            filter f {
                term 1 {
                    from {
                        interface R2-R1;
                    }
                    then {
                        policer p;
                    }
                }
            }
        }
    }
    protocols {
        ldp {
            policing {
                fec <R4> {
                    ingress-traffic f;
                }
            }
        }
    }
}
```

Various embodiments of the principles of the invention have been described. For example, traffic filtering techniques have been described that apply actions to data packets based on associated forwarding equivalence classes of the packets. A forwarding equivalence class (FEC) uniquely identifies a destination of the packets and is automatically associated with incoming interface information that identifies a source of the packets. In this way, traffic may be counted and policed based on a specific source site and a specific destination site of the packet. In addition, the techniques provide anti-spoofing capabilities. These and other embodiments are within the scope of the following claims.

The invention claimed is:

1. A method comprising:
configuring a FEC filter to associate a label distribution protocol (LDP) forwarding equivalence class (FEC) of a label switched path (LSP) with one or more actions, wherein the FEC filter is qualified with incoming interface information that identifies a source interface on which data packets are received;
receiving a data packet;
identifying an LDP FEC of the data packet to assign the data packet to the LSP when the LDP FEC identified for the data packet matches the LDP FEC of the LSP; and
after assigning the data packet to the LSP, selectively applying the FEC filter to the data packet when the LDP FEC of the FEC filter matches the identified LDP FEC of the data packet and when an incoming interface on which the data packet is received matches the source interface identified in the FEC filter.

2. The method of claim 1,
wherein identifying the LDP FEC comprises identifying a destination of the data packet, and
wherein selectively applying the FEC filter further comprises selectively applying the FEC filter to the data packet when the destination of the data packet matches the destination of the LDP FEC associated with the FEC filter.

3. The method of claim 1, wherein qualifying the FEC filter comprises defining the FEC filter based on an interface identifier that allows configuration of one or more incoming interfaces as a match condition of the FEC filter.

4. The method of claim 1, wherein the FEC filter is associated with one of transit traffic or ingress traffic of the LDP FEC.

5. The method of claim 1, further comprising correlating the FEC filter with a next hop of the LDP FEC.

6. The method of claim 1, further comprising mapping FEC filter names to FEC filter indices in a FEC filter table.

7. The method of claim 1, further comprising selecting a next hop for the received data packet according to the LDP FEC of the data packet.

8. The method of claim 1, further comprising:
updating forwarding information of a router to associate the FEC filter with a next hop;
forwarding a next hop message from a routing engine to a packet forwarding engine to specify the next hop and an index of the FEC filter to install the FEC filter within the packet forwarding engine; and
inserting the FEC filter and the next hop in a forwarding path of the packet forwarding engine.

9. The method of claim 1, wherein selectively applying the FEC filter comprises applying the FEC filter to the data packet when the data packet belongs to the LDP FEC and when the data packet is received from a source identified in the FEC filter.

10. The method of claim 9, wherein selectively applying the FEC filter further comprises applying the FEC filter to the data packet when the data packet matches one or more characteristics identified in the FEC filter.

11. The method of claim 1, wherein selectively applying the FEC filter comprises forwarding the data packet directly to a next hop without application of the FEC filter when the data packet does not belong to the LDP FEC or when the data packet belongs to the LDP FEC and is received from a source that is not identified in the FEC filter.

12. The method of claim 1, further comprising receiving statistics from the FEC filter, wherein the statistics includes at least one of data packet counts, data byte counts, marked data packet counts, or dropped data packet counts.

13. The method of claim 1, wherein the data packet travels across either a multi-protocol label switching (MPLS) path or a virtual private LAN service (VPLS) path.

14. The method of claim 1,
wherein selectively applying the FEC filter comprises taking one or more actions with respect to the packet within a forwarding path of a router, and
wherein taking an action comprises one or more of dropping the packet, counting the packet in order to maintain traffic statistics, marking the packet with a loss or gain in priority, updating billing or account information, or changing the forwarding class of the packet.

15. A network device comprising:
a packet forwarding engine that includes forwarding information defining a next hop for a label distribution protocol (LDP) forwarding equivalence class (FEC) assigned to a label switched path (LSP); and
a routing engine that receives configuration data defining a FEC filter that associates the LDP FEC with one or more actions, wherein the FEC filter is qualified with incoming interface information that identifies a source interface on which data packets are received,
wherein the packet forwarding engine identifies an LDP FEC of a received data packet to assign the data packet to the LSP when the LDP FEC identified for the data packet matches the LDP FEC of the LSP and, after assigning the data packet to the LSP, selectively applies the FEC filter to the received data packet when the identified LDP FEC of the received data packet matches the LDP FEC of the FEC filter and when an incoming interface on which the data packet is received matches the source interface identified in the FEC filter.

16. The network device of claim 15,
wherein the forwarding information identifies a destination of the data packet based on the identified LDP FEC, and
wherein the packet forwarding engine, when selectively applying the FEC filter, selectively applies the FEC filter to the data packet when the destination of the data packet matches the destination of the LDP FEC associated with the FEC filter.

17. The network device of claim 15, wherein the routing engine maintains routing information that correlates the FEC filter with a next hop of the LDP FEC.

18. The network device of claim 15, further comprising a FEC filter table that maps FEC filter names to FEC filter indices.

19. The network device of claim 15,
wherein the packet forwarding engine receives a next hop message from the routing engine to specify the next hop and an index of the FEC filter so as to install the FEC filter within the packet forwarding engine, and
wherein the packet forwarding engine inserts the FEC filter and the next hop in a forwarding path of the packet forwarding engine.

20. The network device of claim 15, wherein the data packet travels across one of a multi-protocol label switching (MPLS) path or a virtual private LAN service (VPLS) path.

21. A non-transitory computer-readable medium comprising instructions that, when executed, cause one or more processors to:
configuring a FEC filter to associate a label distribution protocol (LDP) forwarding equivalence class (FEC) of a label switched path (LSP) with one or more of dropping the packet, counting the packet in order to maintain traffic statistics, marking the packet with a loss or gain in priority, updating billing or account information, or changing the forwarding class of the packet, wherein the FEC filter is qualified with incoming interface information that identifies a source interface on which data packets are received;
receive a data packet;
identify an LDP FEC of the data packet to assign the packet to the LSP when the LDP FEC identified for the data packet matches the LDP FEC of the LSP; and
after assigning the data packet to the LSP, selectively apply the FEC filter to the data packet when the LDP FEC of the FEC filter matches the identified LDP FEC of the data packet and when an incoming interface on which the data packet is received matches the source interface identified in the FEC filter.

22. The method of claim 1,
wherein configuring the FEC filter comprises configuring the FEC filter as a first one of a plurality of FEC filters associated with the LDP FEC of the LSP, wherein the first one of the plurality of FEC filters is qualified with first incoming interface information that identifies a first source interface on which data packets are received;
wherein the data packet comprises a first data packet, and
wherein the method further comprises:
configuring a second one of the plurality of FEC filters associated with the LDP FEC of the LSP with one or more actions, wherein the second one of the plurality of FEC filters is qualified with second incoming interface information that identifies a second source interface on which data packets are received;
receiving a second data packet;
identifying an LDP FEC of the second data packet to assign the data packet to the LSP when the LDP FEC identified for the data packet matches the LDP FEC of the LSP; and
after assigning the second data packet to the LSP, selectively applying the second one of the plurality of FEC filters to the second data packet when the LDP FEC of the second one of the plurality of FEC filters matches the identified LDP FEC of the second data packet and when an incoming interface on which the second data packet is received matches the second source interface identified in the second one of the plurality of FEC filters.

\* \* \* \* \*